(12) United States Patent
Einsiedel

(10) Patent No.: US 6,176,514 B1
(45) Date of Patent: Jan. 23, 2001

(54) SIDE AIRBAG

(75) Inventor: Heinrich Einsiedel, Ulm (DE)

(73) Assignee: Takata (Europe) Vehicle Safety Technology GmbH, Ulm (DE)

( * ) Notice: Under 35 U.S.C. 154(b), the term of this patent shall be extended for 0 days.

(21) Appl. No.: 09/318,123

(22) Filed: May 25, 1999

(30) Foreign Application Priority Data

May 26, 1998 (DE) ............................................. 198 23 492

(51) Int. Cl.$^7$ .................................................. B60R 21/24
(52) U.S. Cl. ..................................... 280/730.2; 280/743.1
(58) Field of Search ............................. 280/730.2, 743.1

(56) References Cited

U.S. PATENT DOCUMENTS

| | | | |
|---|---|---|---|
| 5,788,270 | * | 8/1998 | HÅland et al. .................... 280/730.2 |
| 5,899,486 | * | 5/1999 | Ibe ................................. 280/730.2 |
| 5,899,491 | * | 5/1999 | Tschaeschke .................... 280/730.2 |
| 5,957,487 | * | 9/1999 | Stütz ............................... 280/730.2 |
| 6,022,044 | * | 2/2000 | Cherry ............................ 280/730.2 |

FOREIGN PATENT DOCUMENTS

| | | |
|---|---|---|
| 296 14 201 | 11/1996 | (DE) . |
| 196 47 679 | 6/1997 | (DE) . |
| 297 05 489 | 7/1997 | (DE) . |
| 297 05 489 | 9/1997 | (DE) . |
| 297 16 573 | 3/1998 | (DE) . |
| 2 297 950 | 8/1996 | (GB) . |
| 2 324 068 | 10/1998 | (GB) . |

\* cited by examiner

*Primary Examiner*—Kenneth R. Rice
(74) *Attorney, Agent, or Firm*—Foley & Lardner

(57) ABSTRACT

Inflatable side airbag with duct-shaped forming chambers (19) having a fastening side (11), which is provided for the fastening of the airbag along a substantially curvilinear fastening section (23) along a roof spar of a motor vehicle, as well as a free side (15) which can be unfolded through inflation of the airbag, which is fastened at the fastening section (23), along a main development direction (A) which extends substantially downwardly in the vertical direction, and which free side in the thus inflated state of the airbag is provided at the lower side of the airbag as well as lying substantially opposite to the fastening side (11), with the cut of the airbag along the fastening side (11) having a substantially rectilinear border, which has substantially the same length as the total length of the curvilinear fastening section (23), and with the cut having a substantially curvilinear border along the free side (15).

10 Claims, 4 Drawing Sheets

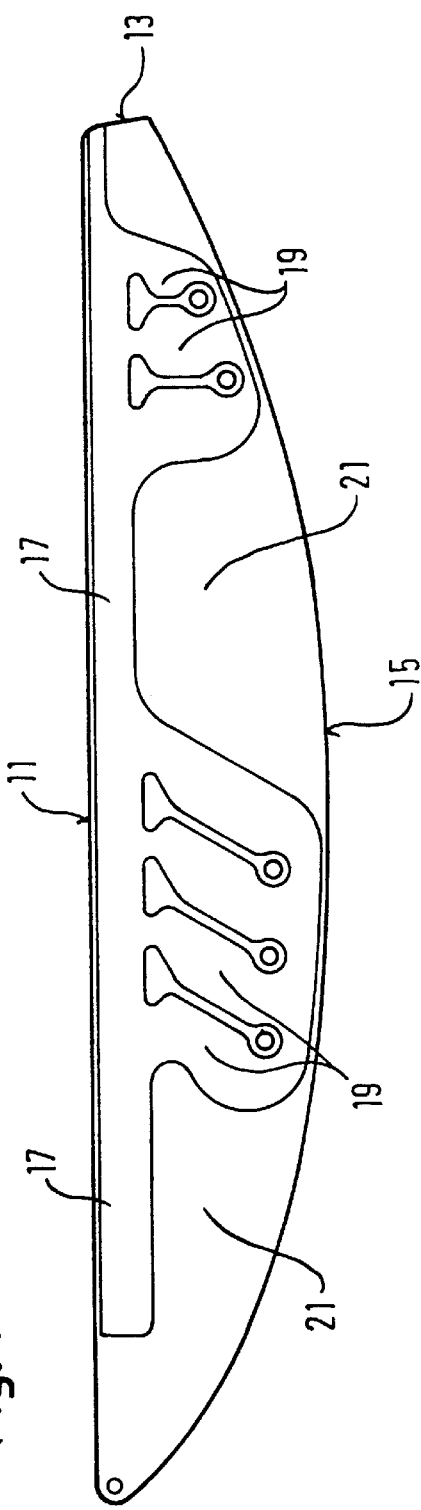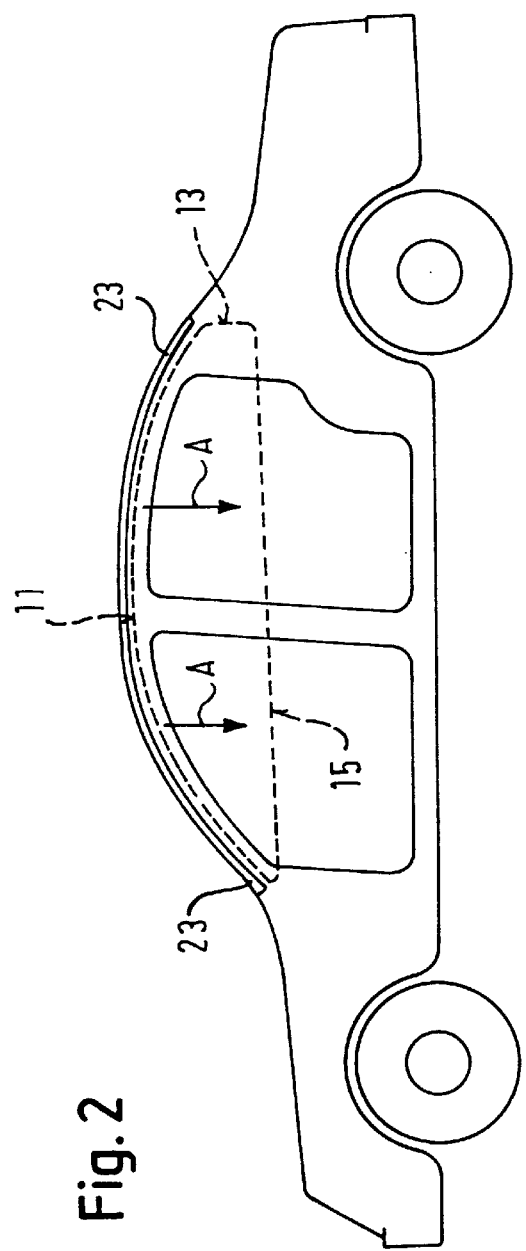

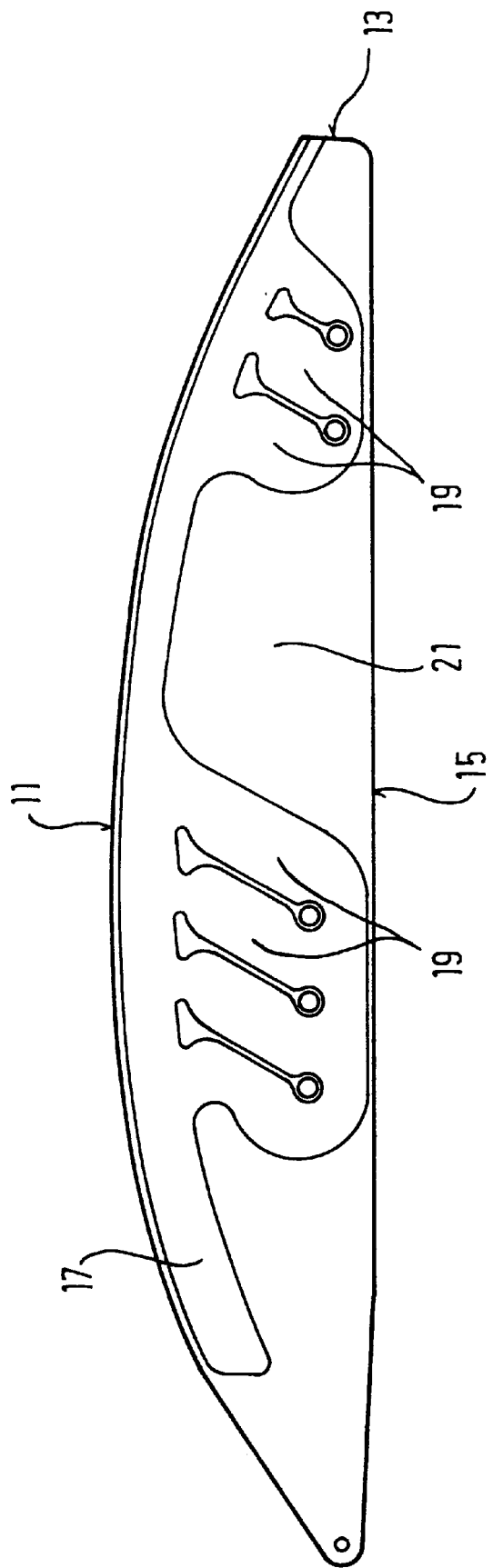

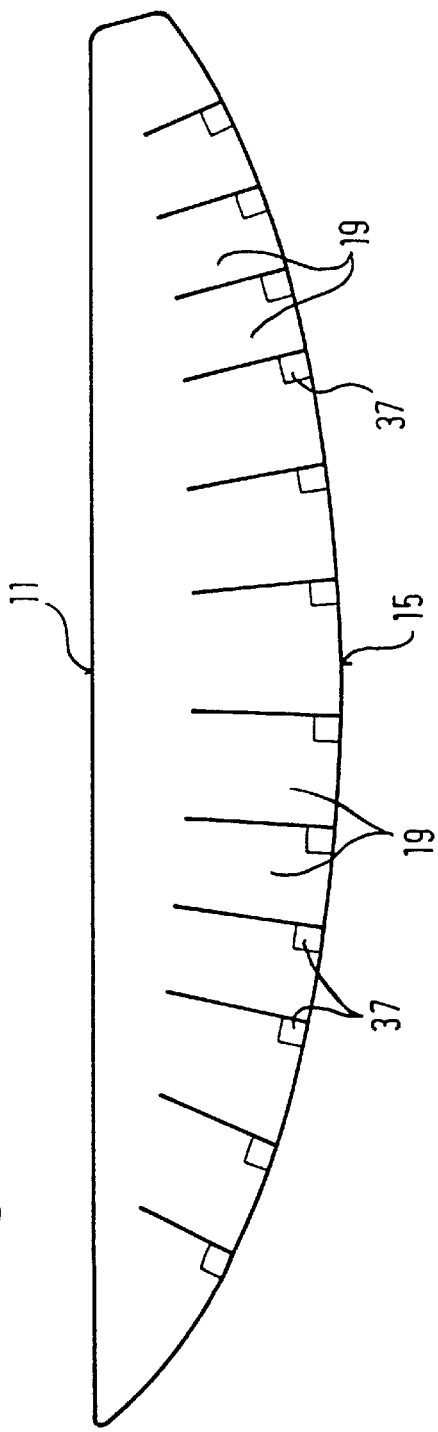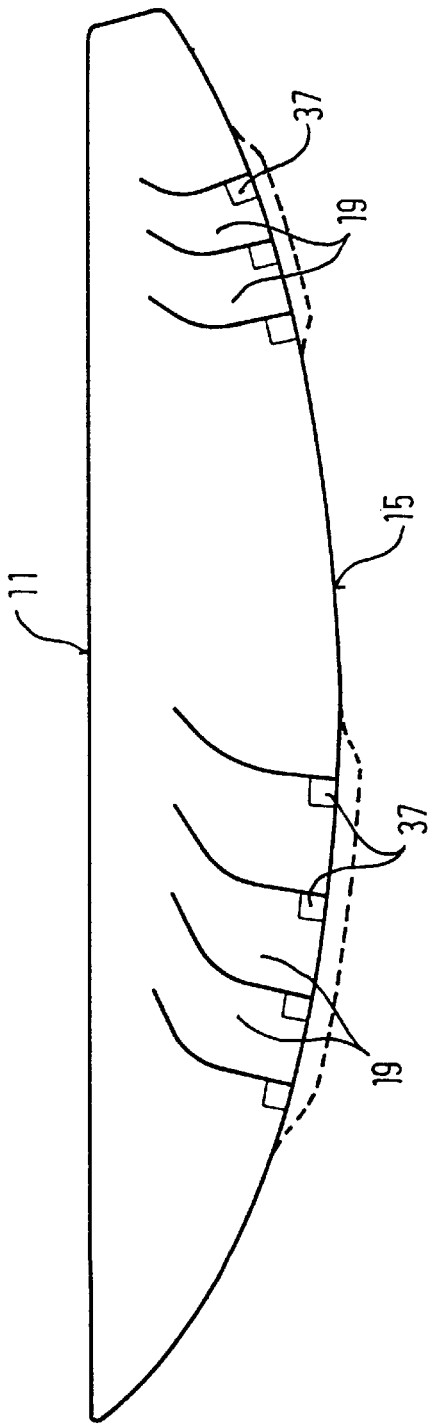

SIDE AIRBAG

Figure 4A:
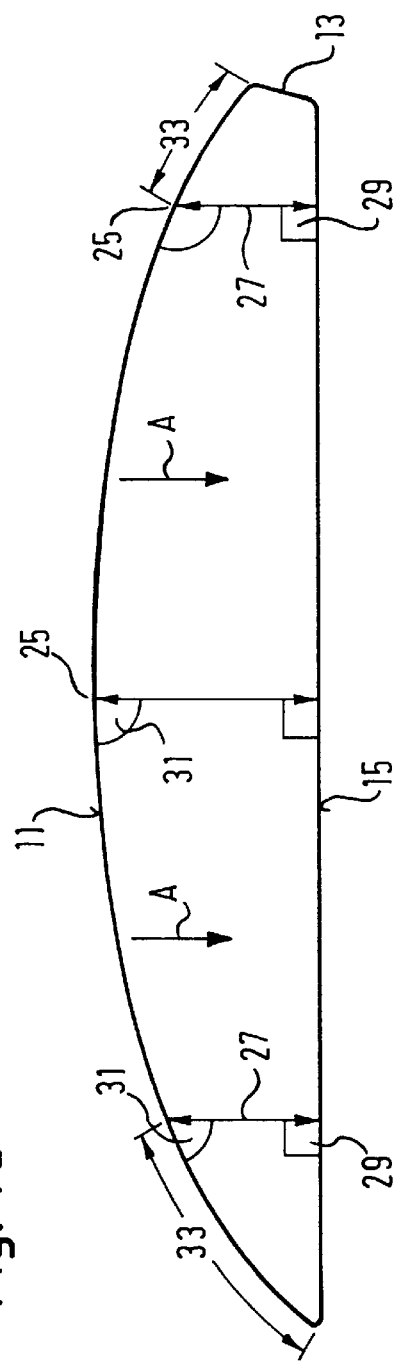

The invention relates to an inflatable side airbag with duct-shaped forming chambers, which has a fastening side which is provided for the fastening of the airbag along a substantially curvilinear fastening section along a roof spar of a motor vehicle as well as a free side which is unfoldable through the inflation of the airbag, which is fastened to the fastening section, along a main development direction extending substantially downwardly in the vertical direction and which free side in the thus inflated state of the airbag is provided at the lower side of the airbag as well as lying substantially opposite to the fastening side.

A side airbag of this kind, in the following designated merely as an "airbag", serves for the protection of passengers of the motor vehicle in the event of an accident. For this the airbag is inflated where appropriate so that it—starting at the fastening section at the roof spar—unfolds in particular in the main development direction and thus forms a protective cushioning between the relevant passenger and the side wall of the motor vehicle. In this the forming chambers serve on the one hand for the formation of protective cushionings, on the other hand for the stabilisation of the orientation of the inflated airbag as well as for the shortening of the airbag during its inflation so that the airbag is tensioned.

A disadvantage of the known airbags is that their shortening, which accompanies the inflation, often produces twistings or the formation of folds at the airbag surface, and indeed above all in the region of the fastening side.

An object of the invention is to provide an airbag of the initially named kind which can be inflated to a shape which is matched to the outline of a roof spar so that the inflated airbag takes on the desired shape, tension and orientation, but that in this however no undesirable twistings or folds arise at the airbag surface. The invention should also show a suitable method for the provision of an airbag of this kind.

This object is satisfied in accordance with the invention by an airbag of the initially named kind, the cut, or tailoring, of which—i.e. the shape of which in the unfolded or outspread, non inflated state—has a substantially rectilinear border along the fastening side which has substantially the same length as the total length of the curvilinear fastening section, and the cut of which has a substantially curvilinear border along the free side.

In the airbag in accordance with the invention the fastening side is formed in the cut—in contrast to the desired curve shape of the fastening side in the inflated state—with a substantially rectilinear border and a length which corresponds to the length integrated over the entire curve path of the fastening section. The border of the fastening side is still to be seen as substantially rectilinear in the sense of this invention even if it has several local discontinuities, which for example result from the matching of the fastening side to the course of a gas tube. In accordance with the invention the border of the free side is formed curvilinearly in cut in such a manner that its course corresponds to the greatest extent to the curvilinear course of the fastening section and to the course of the border of the desired operating shape of the airbag.

The airbag in accordance with the invention can advantageously be inflated in such a manner that its lower, free side is tensioned through shortening, with no twistings or folds arising at the airbag surface. This can be attributed in particular to the following properties of the airbag in accordance with the invention:

Since in the cut the border of the fastening side is formed substantially rectilinearly and the border of the free side substantially curvilinearly, the latter has a greater total length than the former so that the free side has a certain excess length in the state of the airbag which is fastened inside the motor vehicle but is however not yet inflated. In contrast the total length of the fastening side corresponds in the cut to the total length of the fastening section. During the inflation of the airbag the correspondingly arranged forming chambers effect a shortening of the airbag along the free side, with the greatest shortening taking place in the region of the free side, whereas the shortening takes on an increasingly lesser extent in the direction towards the fastening side. Along the border of the fastening side, at which the total lengths of the airbag and the fastening section agree, no shortening takes place. Thus the invention enables a substantially continuous compensation of the shortening required for the tensioning of the airbag, through which disadvantageous twistings or folds are effectively avoided.

Within the framework of the invention it was recognised that, in contrast, in a usual forming of the border of the cut as a centric stretching of the outline of the desired operating shape, a shortening along the lower, free side also makes a corresponding shortening of the same extent at the fastening side necessary. Since the fastening side is guided along the curvilinear roof spar, however, the previously usual cut shape leads to undesirable twistings and folds at the inflated airbag.

A further advantage of the airbag in accordance with the invention is that it can be manufactured in a particularly simple manner. For example the cut can consist of two sides which need not be expressly connected to one another along the particularly stressed fastening side during the inflation of the airbag, but rather, as a result of the rectilinear forming of the border of the fastening side, can be chosen from a single piece of material which is folded over along the fastening side.

In a preferred embodiment of the airbag the latter has a border which is substantially rectilinear and which extends in the horizontal direction at the free side in its operating shape.

Figure 4B:
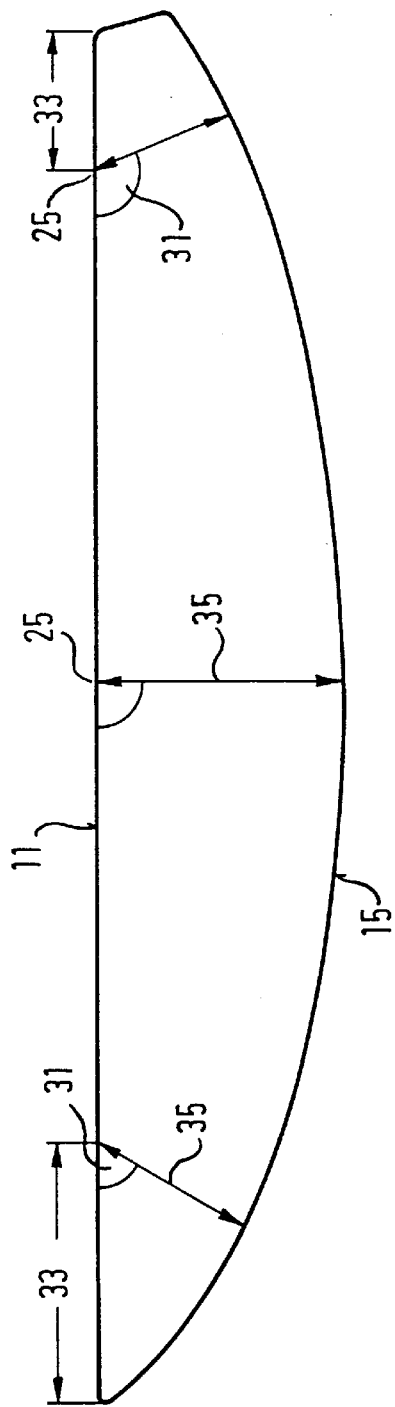

It can be achieved in a particularly effective manner that the airbag has the desired operating shape in the inflated state if in the cut the cut height, i.e. the distance from the border of the fastening side to the border of the free side, is in each case chosen as large as the desired airbag height for a plurality of sections along the fastening side, thus as the corresponding extent of the desired operating shape (cf. FIGS. 4a and 4b).

The design of the airbag in accordance with the invention with the duct-like forming chambers serves—as mentioned—among other things for achieving the desired shortening of the airbag during its inflation. In this a particularly goal-directed shortening of the airbag can be achieved through a corresponding arrangement of the forming chambers and an orientation of their respective duct shape. Basically, one obtains the greatest shortening of the airbag along the free side when the duct shapes of the forming chambers in the cut are formed perpendicular to the border of the free side or to the tangent at this border. The narrowing of a forming chamber during its inflation fundamentally takes place namely to the greatest extent along a plane which stands perpendicular to the duct shape of the forming chamber.

It is however also possible to provide the forming chambers in a different orientation than in the explained manner. The duct shape of the forming chambers preferably extends at the free side perpendicular to its border and in the region of the fastening side at an angle with respect to its border which is matched to the inflow direction of the gas which is provided for the inflation of the airbag or to the support and cushioning function of the airbag, for example at an angle of 30° to 60° to the border of the fastening side.

The duct shapes of the forming chambers are thus not necessarily formed rectilinearly, but can also be formed to be curved in accordance with an arbitrary curve function in particular in the region of the fastening side.

The excess length of the free side of the cut can be shortened with high precision to the length which is desired for the corresponding border of the operating shape of the airbag and which is required for the tensioning of the airbag if the widths or the diameters respectively of the duct-shaped forming chambers are correspondingly chosen in the region of the free side.

The preceding explanation of the cut, which is intended for as twist-free and fold-free an operating shape of the airbag as possible, relates to its basic design. The airbag in accordance with the invention can however be easily adapted in a variety of ways to different applications, in particular to asymmetrical or inhomogeneous arrangements of the forming chambers, starting from this basic construction.

For example the cut can, when the duct shape of a forming chamber does not extend parallel to the main development direction in the operating shape of the airbag and this forming chamber also narrows accordingly during inflation with a certain component along the main development direction, be extended through a corresponding addition at the free side, and indeed in the region of this forming chamber.

Furthermore, it can be advantageous if the forming chambers are displaced in the cut with respect to their position which is desired in the operating shape by such a displacement distance which corresponds to the local shortening of the airbag which is caused by the inflation of the airbag. Through this the geometry of the cut can be adapted to a shortening which is non-uniform with respect to its entire surface.

The object of the invention is satisfied, on the other hand, by such a method for the manufacture of a cut of an airbag in accordance with the invention which is described above, in which the cut is formed along the fastening side which is provided as the upper side of the airbag with a substantially rectilinear border, which has substantially the same length as the total length of the curvilinear fastening section, and in which the cut is formed along the free side which is provided as the lower side of the airbag with a substantially curvilinear border, which, starting from the rectilinear border of the fastening side, corresponds to the course of the fastening section and the course of the border of the free side of the desired operating shape of the airbag.

The features and advantages of this method result in a corresponding manner from the description of the airbag in accordance with the invention. It is possible in particular that the cut height is chosen section-wise to be at least as large as the desired corresponding airbag height.

Further developments of the invention are described in the subordinate claims. The invention will be explained in the following with reference to exemplary embodiments in conjunction with the drawings; in these are shown, in each case in a schematic side view:

FIG. 1 a cut of an airbag in accordance with the invention,

FIG. 2 the fastening of the airbag in accordance with FIG. 1 inside a motor vehicle, FIG. 3 a cut of a known airbag, FIGS. 4a and 4b the airbag in accordance with FIG. 1 in the desired operating shape and in the cut respectively, and FIGS. 5 and 6 a cut of an airbag in accordance with the invention with forming chambers which are formed rectilinearly or curved respectively.

FIG. 1 shows the cut of an airbag in accordance with the invention in a side view. This airbag has a fastening side 11 with a rectilinear border at its upper side in the illustration in accordance with FIG. 1 and a comparatively short transverse side 13 at its right side. Below the fastening side 11 the airbag is formed with a free side 15 in such a manner that its border adjoins the left end of the fastening side 11 and the lower end of the transverse side 13 as a curve which is arched concavely with respect to the fastening side 11. In the side view in accordance with FIG. 1 the cut thus appears like a circular arc. The formation of the airbag with the transverse side 13 can—depending on the envisaged motor vehicle type—also be omitted so that the airbag shown in FIG. 1 can be designed with two acute angles between the borders of the fastening side 11 and of the free side 15.

The illustrated airbag has an inflatable longitudinal forming region 17 which extends almost along the entire fastening side 11 and a plurality of forming chambers 19 which are connected to the longitudinal forming region 17 and which extend up to the free side 15. The longitudinal seams of the forming chambers 19—in contrast to the illustration in accordance with FIG. 1—can also be continued up to the border of the free side 15, for example for the purpose of a still greater shortening of the free side 15. In addition the airbag shown has a plurality of non inflatable tension regions 21 for the transmission of tension forces between different groups of forming chambers 19.

The airbag illustrated in FIG. 1 serves mainly for the lateral protection of passengers of a motor vehicle, in particular of the head and the upper torso of the passengers, by means of the inflated forming chambers 19.

The airbag illustrated in FIG. 1 serves mainly for the lateral protection of passengers of a motor vehicle, in particular of the head and the upper torso of the passengers, by means of the inflated forming chambers 19. For this the airbag is first fastened inside a motor vehicle in the folded together state.

FIG. 2 shows a motor vehicle in a schematic side view. The airbag illustrated in FIG. 1 is fastened at the motor vehicle in the folded together state along a fastening section 23 which extends substantially from the A-column to the C-column along the roof spar of the motor vehicle. In the event of a n accident the airbag, in particular the longitudinal forming region 17 and the forming chambers 19, are inflated for example via a gas tube so that it unfolds substantially along a main development direction A which points vertically downwardly in the illustration in accordance with FIG. 2. The operating shape thus assumed by the airbag is drawn in in FIG. 2 in broken lines.

It thus results from FIG. 2 that the airbag in accordance with the invention is fastened to the motor vehicle with its fastening side 11, which is rectilinearly bordered in cut, along the curvilinear fastening section 23 corresponding to the course of the roof spar. The free side 15, which is curvilinearly bordered in the cut, has in contrast a substantially rectilinear course in the operating shape of the airbag.

The length of the fastening side 11, which is rectilinear in the cut, corresponds substantially to the total length of the fastening section 23. In contrast to this, the total length of the free side 15, which is curvilinearly bordered in the cut, is longer than the length of the free side of the operating shape of the airbag shown in FIG. 2 by an excess length— depending on the motor vehicle type—of for example 200–300 mm. In case the airbag is fastened along the curvilinear fastening section 23 at the motor vehicle with its fastening side 11, which is rectilinear in the cut, the free side 15, which is curvilinearly bordered, thus warps into folds—in the event that the airbag unfolds, but is not inflated.

As soon as the mounted airbag is inflated, this excess length of the border of the free side 15 is however used up through the shortening of the airbag so that the lower edge of the inflated airbag extends rectilinearly and is firmly tensioned, as shown in FIG. 2. Since the airbag conversely has the same total length along the fastening side 11 as the fastening section 23 as a result of its forming in accordance with the invention, the inflated airbag has no undesirable twistings or folds along the main development direction A.

FIG. 3 shows in a schematic side view a cut of a known airbag, with the same reference symbols as in FIG. 1 designating similar or corresponding parts. The border of the cut of this known airbag emerges substantially as a centric stretching of the outline of the desired operating shape of the airbag which is shown in broken lines in FIG. 2; i.e. the cut of the known airbag has substantially the same outline as the desired operating shape, but is formed larger than the latter with respect to its extension directions illustrated in FIG. 3.

During the inflation of the cut illustrated in FIG. 3 the latter can admittedly assume the desired operating shape shown in dotted lines in FIG. 2. Since however the border of the fastening side 11 in the cut is longer than the fastening section 23 at the motor vehicle, undesirable folds and twistings arise, in particular in the region of the fastening side 11, at the forming chambers 19 and along the tension regions 21.

A possibility in accordance with the invention of determining that cut height between the fastening side 11 and the free side 15 which leads to a desired corresponding airbag height when the airbag is inflated and which in this corresponds to the course of the fastening section 23 as well as to the course of the border of the free side 15 of the desired operating shape of the airbag is explained in the following with reference to FIGS. 4a and 4b.

FIG. 4a shows the borders of the fastening side 11, transverse side 13, and the free side 15 of the airbag in accordance with FIG. 1 in its desired operating shape. The illustration of the airbag in FIG. 4a thus corresponds to the broken-line illustration of this airbag in the inflated state when mounted inside the motor vehicle in accordance with FIG. 2. In FIG. 4a the main development direction A, which accordingly extends downwardly in the vertical direction, is drawn in.

For a plurality of dimensioning locations 25 along the border of the fastening side 11 the airbag height 27 of this border from the border of the free side 15 is illustrated, and indeed in each case in a direction parallel to the main development direction A. The airbag height 27 thus stands at a right angle 29 to the border of the free side 15 and at a definite separation angle 31 to the border of the fastening side 11. In FIG. 4a in addition, for two dimensioning locations 25, their distance 33 along the border of the fastening side 11 up to the respective end of the fastening side 11 is illustrated.

FIG. 4b shows the cut of the airbag in accordance with FIG. 4a and thus corresponds to the illustration of the airbag in accordance with FIG. 1. This cut can be constructed in the following way starting from the desired operating shape illustrated in FIG. 4a:

A rectilinear course is provided for the border of the fastening side 11 of the cut, and indeed with the same length as the total length of the border of the fastening side 11 in the desired operating shape of the airbag and thus as the corresponding total length of the fastening section 23 along the roof spar of the motor vehicle shown in FIG. 2.

Along this rectilinear border of the cut the position of the dimensioning locations 25 is determined. These are located along the border of the fastening side 11 of the cut at the same distance 33 from the respective end of the fastening side 11 as the desired operating shape shown in FIG. 4a.

At the dimensioning locations 25 a cut height 35 is now applied in each case which is exactly as long as and stands at the same separation angle 31 to the border of the fastening side 11 as the corresponding airbag height 27. The cut height 35 and the airbag height 27 thus correspond to one another to the effect that they have the same length and are both dimensioned from corresponding dimensioning location 25 along the border of the fastening side 11 with the same separation angle 31 for this.

From the thus determined cut height 35, which is applied to the rectilinear fastening side 11 of the cut, thus the border of the free side 15 in the cut results. This border of the free side 15 have a curvilinear course and it borders the cut height 35 substantially at a right angle in each case.

The basic construction of the cut of the airbag in accordance with the invention which was explained in connection with FIGS. 4a and 4b presupposes for its operating shape which is shown in FIG. 4a a course of the forming chambers of the airbag which is substantially parallel to the main development direction A. Accordingly, the duct shape of each forming chamber 19 in the cut shown in FIG. 4b should extend substantially parallel to the cut height 35 and thus perpendicular to the border of the free side 15.

A course of the forming chambers 19 in the cut of this kind which is ideal with respect to the shortening of the airbag is shown in FIG. 5, which corresponds to the illustration of the cut in accordance with FIG. 4b. The duct shape of the schematically drawn in forming chambers 19 stands in each case at a right angle 37 to the border of the free side 15.

Deviations from an ideal construction of the airbag of this kind with uniformly distributed forming chambers, of which the duct shape in each case extends rectilinearly perpendicular to the border of the free side 15, can be made within the framework of the invention without further ado if then for example an improved inflation behaviour of the airbag or a more favourable adaptation of the arrangement of the forming chambers to the regions to be protected along the motor vehicle side is to take place.

In FIG. 6 a curved course of individual forming chambers 19 is illustrated in an exemplary manner for this in a cut which corresponds to that illustrated in FIG. 1. The duct shape of these forming chambers 19 likewise stands in each case at a right angle 37 to the border of the free side 15. The respective duct shape is however curved with respect to a rectilinear course in the direction towards the fastening side 11.

Since a forming chamber 19 narrows substantially perpendicular to its duct shape during inflation, the curved course of the forming chambers 19 illustrated in FIG. 6 produces not only a shortening of the free side 15, but also a narrowing of the airbag in the vertical direction in the illustration in accordance with FIG. 6. This narrowing can—with respect to the idealised construction of the cut in accordance with FIG. 5—be taken into account in that in each case an addition in the cut is provided at the free side 15 of the cut in the region of the forming chambers 19, which are formed to be curved, as is shown in broken lines in FIG. 6.

LIST OF REFERENCE NUMERALS 11 fastening side
13 transverse side
15 free side
17 longitudinal forming region
19 forming chamber
21 tension region
23 fastening section
25 dimensioning location
27 airbag height
29 right angle
31 separation angle
33 distance
35 cut height
37 right angle
A main development direction

What is claimed is:

1. Inflatable side airbag with duct-shaped forming chambers (19) having
    a fastening side (11) which is provided for the fastening of the airbag along a substantially curvilinear fastening section (23) along a roof spar of a motor vehicle, as well as a free side (15) which can be unfolded through inflation of the airbag, which is fastened at the fastening section (23), along a main development direction (A) which extends substantially downwardly in the vertical direction, and which in the thus inflated state of the airbag is provided at the lower side of the airbag as well as lying substantially opposite to the fastening side (11),
    characterised in that
    the cut of the airbag along the fastening side (11) has a substantially rectilinear border, which has substantially the same length as the total length of the curvilinear fastening section (23); and in that the cut along the free side (15) has a substantially curvilinear border.

2. Airbag in accordance with claim 1,
    characterised in that
    the shape of the airbag in the state which is inflated and fastened at the fastening section (23) (operating shape) has a border at the free side (15) which is substantially rectilinear and extends in the horizontal direction.

3. Airbag in accordance with claim 2
    characterised in that
    in the cut the distance (35) between the rectilinear border of the fastening side (11) and the border of the free side (15) (cut height) is chosen section-wise in each case to be at least as large as the corresponding extent (27) of the desired operating shape of the airbag (airbag height).

4. Airbag in accordance with claim 3
    characterised in that
    the duct shape of a forming chamber (19) in the cut is formed at the free side (15) to be substantially perpendicular to the border of the free side (15) or to its tangent respectively.

5. Airbag in accordance with claim 4
    characterised in that
    the duct shape of a forming chamber (19) in the cut is formed to be substantially rectilinear or curved.

6. Airbag in accordance with claim 5
    characterised in that
    the widths or the diameters respectively of the duct shapes are chosen at least in the region of the free side (15) in such a manner that the total length of the border of the free side (15) of the cut is shortened by a narrowing of the forming chambers (19) to the desired corresponding total length of the operating shape which takes place during the inflation of the airbag.

7. Airbag in accordance with claim 6
    characterised in that
    for the compensation of a course of the duct shape of a forming chamber (19) at an angle to the main development direction which is different from zero, the cut height (35) is extended in the region of this forming chamber (19) with respect to the airbag height (27) through an addition in the cut.

8. Airbag in accordance with claim 7
    characterised in that
    in the cut the forming chambers (19) are displaced in each case by such a displacement distance with respect to their desired position in the inflated state of the airbag which corresponds in length and direction to the shortening of the airbag transverse to the duct-shaped course of the forming chambers (19) which is caused by the inflation of the airbag.

9. Method for the manufacture of a cut of a side airbag in accordance with claim 8
    characterised in that
    the cut is formed along the fastening side (11) with a substantially rectilinear border which has substantially the same length as the total length of the curvilinear fastening section (23); and in that the cut is formed along the free side (15) with a substantially curvilinear border which, starting from the rectilinear border of the fastening side (11), corresponds to the course of the fastening section (23) and to the course of the border of the free side (15) of the desired operating shape of the airbag.

10. Airbag in accordance with claim 9,
    characterised in that
    in the formation of the cut along the free side (15) with the substantially curvilinear border the cut height (35) is chosen to be at least as large for a plurality of sections along the fastening side (11) as the desired corresponding airbag height (27).

* * * * *